United States Patent [19]

Boucher

[11] 4,295,641
[45] Oct. 20, 1981

[54] DEVICE FOR HOLDING A WORKPIECE TO BE MACHINED IN A SPECIFIC POSITION IN RELATION TO A MACHINE-TOOL ON WHICH IT MAY BE FIXED

[75] Inventor: Pierre Boucher, Objat, France

[73] Assignee: Etablissements Boucher Frères, France

[21] Appl. No.: 122,867

[22] Filed: Feb. 20, 1980

[30] Foreign Application Priority Data

Feb. 20, 1979 [FR] France ................ 79 04613

[51] Int. Cl.³ .............................. B23Q 3/00
[52] U.S. Cl. ........................ 269/136; 269/138; 269/253; 269/285
[58] Field of Search ............. 269/134–138, 269/246, 250–251, 253, 285

[56] References Cited

U.S. PATENT DOCUMENTS

| 2,880,638 | 4/1959 | Muggli et al. | 269/250 X |
| 3,312,461 | 4/1967 | Copron | 269/246 X |
| 3,397,880 | 8/1968 | Kuban | 269/134 X |
| 4,221,369 | 9/1980 | Takasugi | 269/138 |
| 4,223,879 | 9/1980 | Wolfe et al. | 269/136 |

Primary Examiner—Robert C. Watson

[57] ABSTRACT

This clamping device comprises a fixed jaw and a movable jaw sliding on the body of the fixed jaw; it comprises furthermore a structure for receiving the reactions of the stresses exerted on the fixed and movable jaws, this structure having for this purpose a front part against which the fixed jaw bears and a rear part having therethrough a tapped orifice in which the threaded portion of the clamping screw of the movable jaw is meshingly engaged; the front part and the rear part of this structure are each formed by a flange, and these two flanges are connected to one another, in the central part thereof, by means of at least one stay-rod, parallel to the clamping screw, and in the lower part thereof opposite that where the clamping screw is located by at least one compression bar.

11 Claims, 4 Drawing Figures

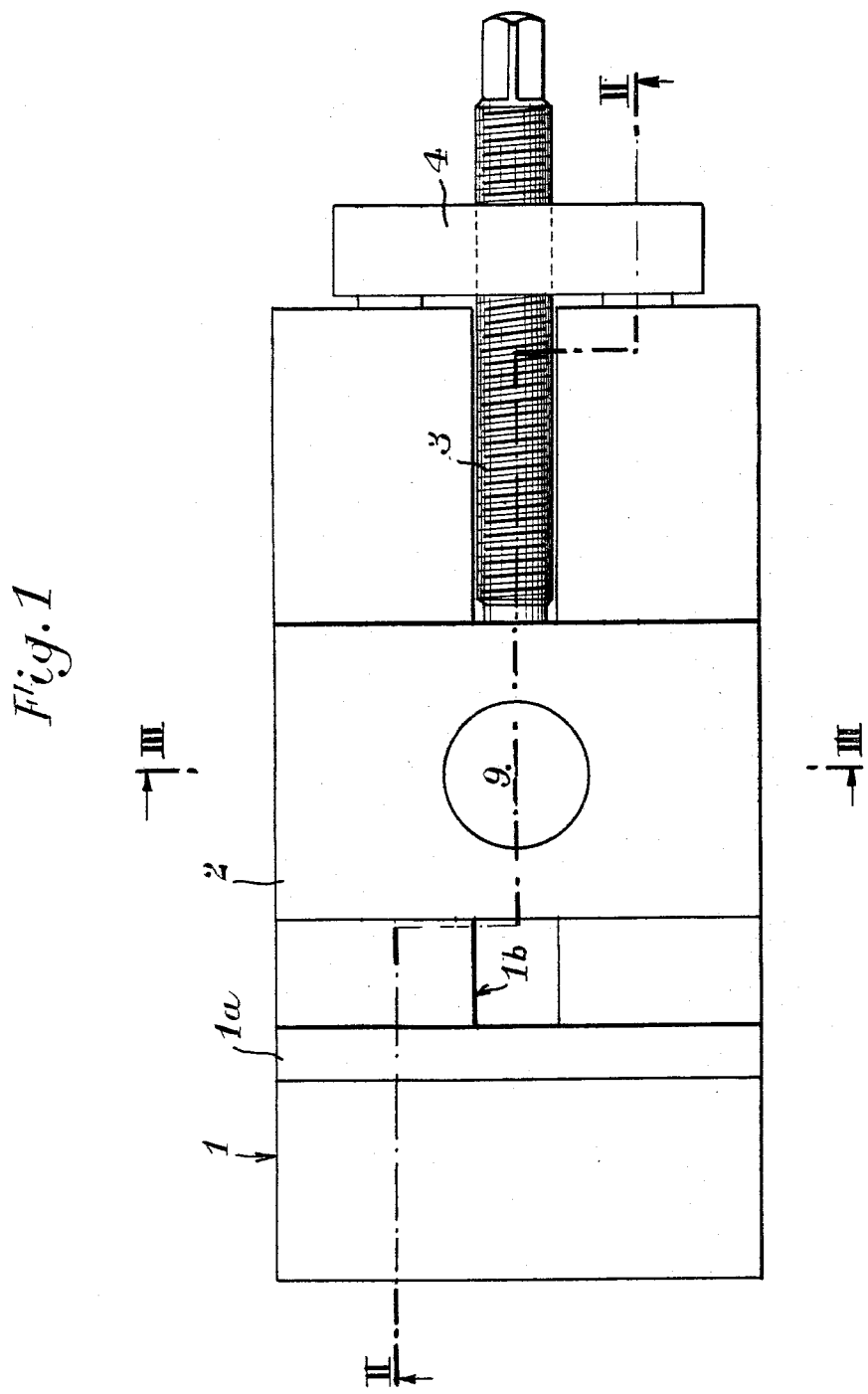

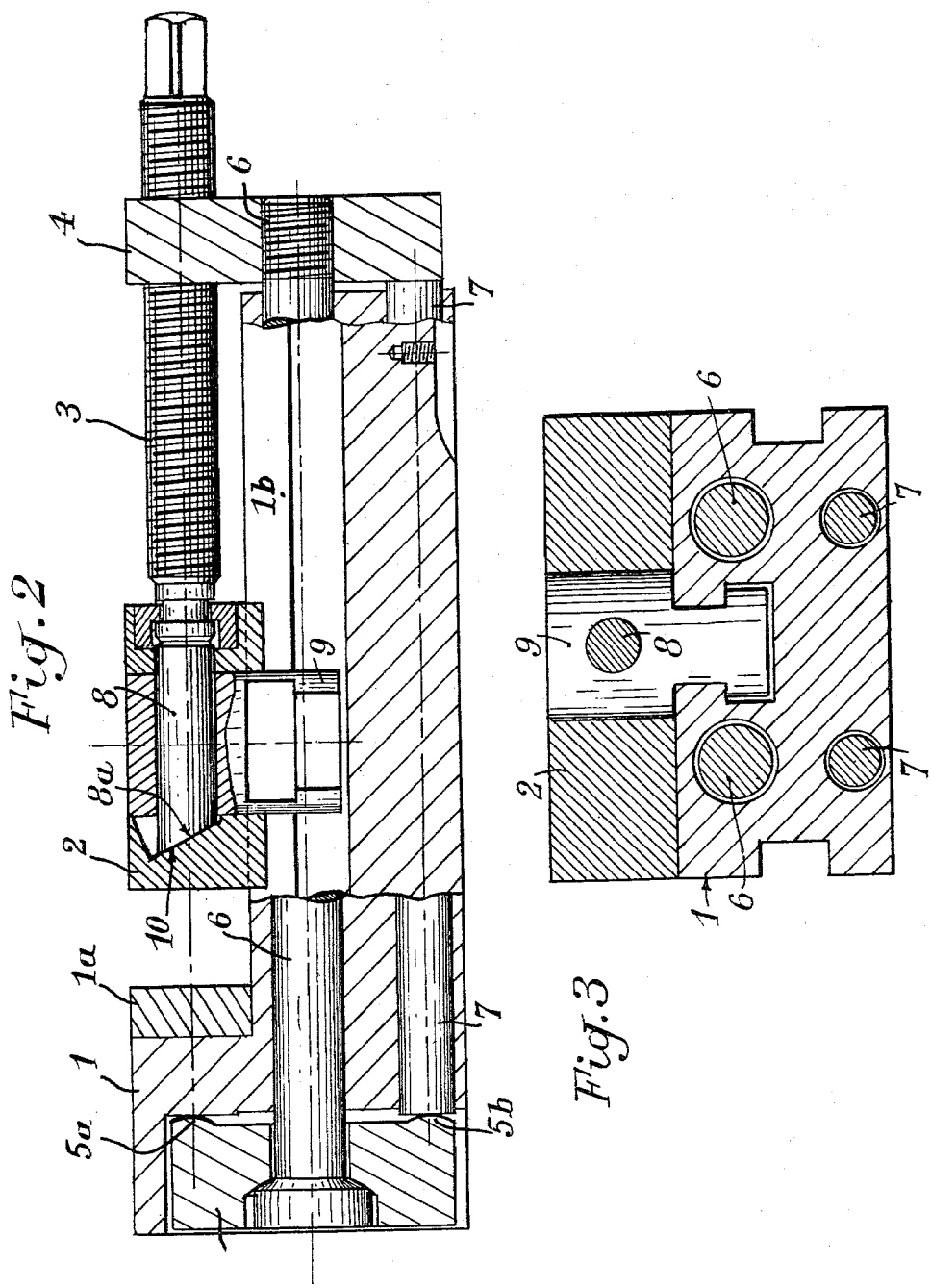

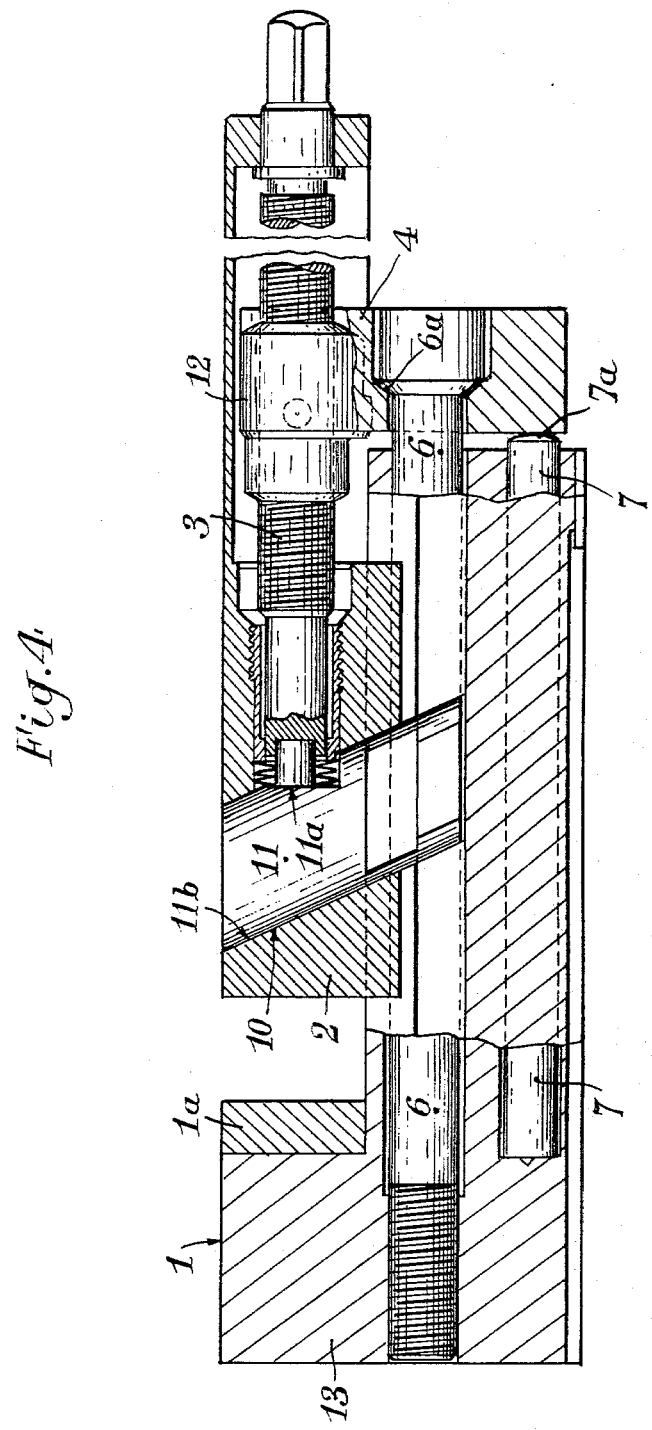

DEVICE FOR HOLDING A WORKPIECE TO BE MACHINED IN A SPECIFIC POSITION IN RELATION TO A MACHINE-TOOL ON WHICH IT MAY BE FIXED

BACKGROUND OF THE INVENTION

Devices for holding a workpiece to be machined in a specific position in relation to a machine-tool on which they may be fixed usually comprise a fixed jaw having two orthogonal reference surfaces, a jaw movable perpendicularly to one of these surfaces and a clamping screw, also perpendicular to this surface, for clamping the machined workpiece between the fixed jaw and the movable jaw; at present they correspond but very imperfectly to the desired aim; in fact, when they are subjected to a substantial clamping force, bending occurs in the body of the fixed jaw on which the movable jaw slides and this bending causes geometrical faults in the position of the jaws; furthermore, if they are subjected to a repetition of stresses permanent deformations occur which make these same shortcomings permanent.

To prevent this it has been proposed to reinforce and support such a structure by means of a complementary structure intended to receive the reactions of the stresses exerted on the fixed and movable jaws, comprising for this purpose a front part, against which the fixed jaw bears and a rear part having therethrough a tapped orifice through which the threaded portion of the clamping screw of the movable jaw passes and in which it is engaged.

In all the devices known up to present, this complementary structure is formed by an elongated part having its two ends raised, one of which serves as support for the fixed jaw, and the other of which has therethrough a tapped orifice in which the clamping screw of the movable jaw is in meshing engagement.

Now, when such a structure is subjected to stresses caused by energetic clamping of the clamping screw, the elongated part bends which adversely affects the efficiency of the clamping; furthermore, this elongated part is large in size and it requires accordingly a large cut-out in the body of the fixed jaw for housing it therein, which adversely affects the rigidity of this body.

SUMMARY OF THE INVENTION

The present invention provides a device for holding a workpiece to be machined in a specific position in relation to a machine-tool on which it may be fixed, and this whatever the clamping, comprising a fixed jaw having two orthogonal reference surfaces, a jaw movable perpendicularly to one of these surfaces and a clamping screw, also perpendicular to this surface, for clamping the machined workpiece between the fixed jaw and the movable jaw, and comprising furthermore a structure for receiving the reactions of the stresses exerted on the fixed and movable jaws, this stucture having for this purpose a front part against which the fixed jaw bears and a rear part having therethrough a tapped orifice through which the threaded portion of the clamping screw of the movable jaw passes and in which it meshes; said complementary structure being arranged so as to eliminate all the above-mentioned disadvantages of those known up to present.

To this end, this structure is formed by two flanges connected to one another, in the central part thereof, by at least one stay-rod parallel to the clamping screw and, in the lower part thereof opposite that where the clamping screw is to be found, by at least one compression bar.

It will be readily understood that with such an arrangement of the complementary structure, the stay-rod(s) parallel to the clamping screw receive all the pulling strain and the compression bar(s), also parallel to the clamping screw, receive therewith all the compression forces, without any of them being subjected to a bending stress.

As for the flanges, their central part is subjected to the tension force due to the reaction of the stay-rods, and their upper and lower parts to equal and symmetrical thrusts which balance out, due to the clamping screw for one and to the reaction of the compression bars for the other; these are small and solid parts which may be easily dimensioned so that the bending thereof does not adversely affect the efficiency of the clamping.

The stay-rods and compression bars, which are not subjected to a bending stress, may be small in section and the same goes for the orifices of the body of the fixed jaw, through which these stay rods and these bars freely pass; these orifices do not then weaken the body of the fixed jaw, which is not subjected to any bending stress and which may then easily have the desired rigidity.

The above and other objects, features and advantages of the present invention will become apparent from the following description given solely by way of non limiting illustration, when taken in conjunction with the accompanying drawings.

DESCRIPTION OF THE DRAWINGS

FIG. 1 is a top view of an embodiment of the present invention.

FIG. 2 is a longitudinal sectional view along line II—II of FIG. 1.

FIG. 3 is a cross-sectional view along line III—III of FIG. 1.

FIG. 4 is a view similar to that of FIG. 2 showing a variation.

DESCRIPTION OF THE PREFERRED EMBODIMENTS

The device shown comprises conventionally a fixed jaw 1a body 1 in which slides 1b are provided which guide the sliding of the movable jaw 2 under the action of clamping screw 3.

However, this latter, instead of meshing with the tapped thread of an orifice provided in a lug of the body of the fixed jaw, is meshingly engaged with the tapped thread of an orifice provided in a flange 4, connected to a counter-flange 5 by means of stay-rods 6 in the central part thereof and by means of compression bars 7 in the lower part thereof.

Fixed jaw 1 bears on the bulging part 5a of counter-flange 5, provided in the axis of clamping screw 3, and the compression bar on the other bulging part 5b thereof, symmetrical with the preceding one in relation to stay-rod 6.

In fact, as shown in FIG. 3, there are two stay-rods 6, symmetrical in relation to the plane of symmetry of fixed 1 and movable 2 jaws passing through the axis of the clamping screw, and two thrust bars 7 symmetrical in relation to this same plane.

The plane containing the axes of these two compression bars 7 is at the same distance from the plane containing the two stay-rods 6 as the axis of clamping screw 3.

The stay-rods 6 and compression bars 7 are only subjected to axial forces and to no bending stress, and flanges 4 and 5 are separate parts, short and solid, subjected to well balanced forces; the whole of the deformations of this device cause during clamping free axial sliding of stay-rods 6 and compression bars 7; only the bulging part 5a of the counter-flange 5, on which body 1 of fixed jaw 1a bears, remains in its initial position.

Therefore, whatever the clamping power, there is no possibility of deformation of body 1 of the fixed jaw, which is subjected to no bending stress.

The stay-rods 6, which may be small in diameter since they are only subjected to pulling forces, freely pass through holes provided for this purpose in body 1 of the fixed jaw; the compression bars 7, subjected only to compression forces, also freely pass through holes provided for this purpose in body 1, but such that they avoid any possibility of buckling.

In the extension of clamping screw 3, a piston 8 is housed in a corresponding orifice of the movable jaw 2 and yoke 9; this latter has an H-shaped cross-section allowing it to slide on slides 1b of body 1 of the fixed jaw; end 8a of piston 8 is sloping from bottom to top from the rear forwardly, and it bears on a face 10, having the same slope, of movable jaw 2.

Thus, at the beginning of clamping, movable jaw 2 is applied against the upper faces guiding the sliding of movable jaw 2 on body 1 of the fixed jaw, and then by reaction piston 8 raises yoke 9 and so maintains the lower shoulder thereof applied against the lower faces guiding the sliding of movable jaw 2 on body 1 of the fixed jaw.

With the front end 8a of piston 8 bearing against surface 10, having the same slope, of movable jaw 2, the resultant of the thrust forces exerted by clamping screw 3 on the movable jaw is axial and directed towards the bulging part 5a of flange 5 against which the lower part of the body of the fixed jaw 1a bears.

In the variation shown in FIG. 4, the sloping end of clamping screw 3 is formed by yoke 11, also in the form of an H, which differs from yoke 9 in that it is formed by a sloping cylinder instead of an upright cylinder, as yoke 9; its rear face comprises a land 11a, on which bears the end of clamping screw 3, and its sloping front face 11b cooperates with a face 10, having the same slope, of the orifice of movable jaw 2, in which this yoke 11 may freely slide, so as to produce the same result as the sloping face 8a of piston 8 cooperating with the face 10, having the same slope, of the movable jaw 2 in the embodiment described above.

To avoid any possibility of jamming the clamping screw 3 is meshingly engaged with a nut 12 mounted through a swivel joint in flange 4.

In some cases where a smaller degree of accuracy is sufficient, flange 5 may be formed by the rear part 13 of body 1 of fixed jaw 1a, as FIG. 4 also shows; it is also subjected to the tension exerted by stay-rod 6 counterbalancing the thrust exerted by clamping screw 3 and compression bar 7, as flange 5 of FIGS. 1 to 3.

It is then the ends of stay-rods 6 on flange 4 side which are mounted by means of a swivel joint at 6a, on said flange 4, just as the ends 7a of compression bars 7, so as to avoid any risk of these stay rods 6 and compression bars 7 jamming in the corresponding holes of body 1 of jaw 1a.

It is apparent that within the scope of the invention, modifications and different arrangements can be made other than are here disclosed. The present disclosure is merely illustrative with the invention comprehending all variations thereof.

What is claimed is:

1. A device for holding a workpiece to be machined in a specific position in relation to a machine-tool on which this device may be fixed, even when it is subjected to a substantial clamping force, comprising a fixed jaw having two orthogonal reference surfaces, a jaw movable perpendicularly to one of these surfaces, and a clamping screw, also perpendicular to this surface, for clamping the machined workpiece between the fixed jaw and the movable jaw, and comprising furthermore a structure for receiving the reactions of the stresses exerted on the fixed and movable jaws, this structure having for this purpose a front part against which the fixed jaw bears and a rear part having therethrough a tapped orifice, through which the threaded portion of the clamping screw is meshingly engaged, the improvement consisting in the front and rear parts of this structure being each formed by a flange, and these two flanges being connected to one another, in the central part thereof, by at least one stay-rod parallel to the clamping screw and, in the lower part thereof opposite that where the clamping screw is to be found, by means of at least one compression bar.

2. The device as claimed in claim 1, wherein the stay rod passes freely through a hole provided in the body of the fixed jaw.

3. The device as claimed in any one of claims 1 or 2, wherein the compression bar passes freely through a hole provided in the body of the fixed jaw.

4. The device as claimed in claim 1, wherein there are two stay-rods symmetrical in relation to the plane of symmetry of the fixed and movable jaws passing through the clamping screw.

5. The device as claimed in claim 1, where there are two compression bars symmetrical in relation to the plane of symmetry of the fixed and movable jaws passing through the clamping screw.

6. The device as claimed in claim 1 wherein there are a plurality of compression bars and stay-rods and the compression bars are in a position symmetrical to that of the clamping screw in relation to the stay-rods.

7. The device as claimed in claim 1, wherein the body of the fixed jaw bears against a bulging part of the flange of the front part of the structure situated in the axis of the clamping screw.

8. The device as claimed in claim 1, wherein the compression bar bears against a bulging part of the flange of the front part of the structure situated in the extension of its axis.

9. The device as claimed in claim 1 wherein the flange of the front part of the structure is formed by the rear part of the body of the fixed jaw.

10. The device as claimed in claim 1, in which an extension of the clamping screw comprises a surface sloping from bottom to top, from the rear forwards, in contact with a surface, having the same slope, of the movable jaw, through which the screw exerts its thrust on the movable jaw, wherein the contact sections of these two surfaces are symmetrical in relation to the axis of the clamping screw.

11. The device as claimed in claim 10, wherein a yoke, sliding freely upwards or downwards in a corresponding orifice of the movable jaw, has a lower H-shaped end sliding on slides of the body of the fixed jaw, and is urged upwards by the reaction of the thrust of the front sloping part of the clamping screw on the surface, having the same slope, of the movable jaw.

* * * * *